US009626936B2

United States Patent
Bell

(10) Patent No.: US 9,626,936 B2
(45) Date of Patent: Apr. 18, 2017

(54) DIMMING MODULE FOR AUGMENTED AND VIRTUAL REALITY

(71) Applicant: Cynthia Bell, Kirkland, WA (US)

(72) Inventor: Cynthia Bell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/465,000

(22) Filed: Aug. 21, 2014

(65) Prior Publication Data

US 2016/0055822 A1 Feb. 25, 2016

(51) Int. Cl.
| | | |
|---|---|---|
| G09G 5/10 | (2006.01) | |
| G02B 27/01 | (2006.01) | |
| G02F 1/15 | (2006.01) | |

(52) U.S. Cl.
CPC .............. *G09G 5/10* (2013.01); *G02B 27/017* (2013.01); *G02B 27/0172* (2013.01); *G02F 1/15* (2013.01); *G02B 2027/014* (2013.01); *G02B 2027/0118* (2013.01); *G02B 2027/0178* (2013.01); *G09G 2320/0233* (2013.01); *G09G 2360/144* (2013.01)

(58) Field of Classification Search
CPC .............. G09G 5/10; G09G 2360/144; G09G 2320/0233; G02B 27/0172; G02B 2027/0118; G02B 2027/014; G02B 2027/0178
USPC .................................................. 345/207, 7–9
See application file for complete search history.

(56) References Cited

U.S. PATENT DOCUMENTS

| | | |
|---|---|---|
| 7,710,655 B2 | 5/2010 | Freeman et al. |
| 8,487,233 B2 | 7/2013 | Baudou et al. |

(Continued)

FOREIGN PATENT DOCUMENTS

| | | |
|---|---|---|
| DE | 202010013016 U1 | 2/2011 |
| JP | S56146123 A | 11/1981 |
| JP | 2014021452 A | 2/2014 |

OTHER PUBLICATIONS

Klepper, Sebastian, "Augmented Reality—Display Systems", Retrieved on: Apr. 2, 2014, Available at: http://campar.in.tum.de/twiki/pub/Chair/TeachingSs07ArProseminar/1_Display-Systems_Klepper_Report.pdf.

(Continued)

*Primary Examiner* — Stephen Sherman
(74) *Attorney, Agent, or Firm* — Vierra Magen Marcus LLP

(57) ABSTRACT

The technology provides a dimming module for a near-eye display (NED) device that controls an amount of ambient light that passes through the transmissive near-eye display to a user. The dimming module includes at least one electrochromic cell that enables variable density dimming so that the NED device may be used in an augmented reality (AR) and/or virtual reality (VR) application. The electrochromic cell may be a monochrome electrochromic cell having stacked layers of, a monochrome electrochromic compound layer and insulator sandwiched between a pair of transparent substrates and conductors. A current may be applied to the conductor layers to control the amount of dimming in response to a dimming value. A NED device having a dimming module may be included in a visor, or other type of head-mounted display (HMD). The dimming module may be flat and supported by a flat waveguide mount in the user's field of view.

15 Claims, 8 Drawing Sheets

(56) References Cited

U.S. PATENT DOCUMENTS

| | | | |
|---|---|---|---|
| 2008/0136336 A1* | 6/2008 | Kalnitsky | H05B 33/0854 315/158 |
| 2012/0050044 A1* | 3/2012 | Border | A61M 21/02 340/573.1 |
| 2012/0050141 A1 | 3/2012 | Border et al. | |
| 2012/0105473 A1 | 5/2012 | Bar-Zeev et al. | |
| 2012/0212398 A1 | 8/2012 | Border et al. | |
| 2013/0113973 A1 | 5/2013 | Miao | |
| 2013/0286053 A1 | 10/2013 | Fleck et al. | |
| 2013/0328925 A1 | 12/2013 | Latta et al. | |
| 2013/0335404 A1 | 12/2013 | Westerinen et al. | |
| 2013/0335435 A1 | 12/2013 | Ambrus et al. | |
| 2014/0085190 A1* | 3/2014 | Erinjippurath | G02B 27/0172 345/156 |
| 2014/0111838 A1 | 4/2014 | Han et al. | |
| 2014/0340286 A1* | 11/2014 | Machida | G02B 26/0833 345/8 |
| 2015/0206321 A1* | 7/2015 | Scavezze | G06T 7/20 345/633 |
| 2015/0309312 A1 | 10/2015 | Alton et al. | |

OTHER PUBLICATIONS

"Moverio™ BT-100 Wearable Display", Retrieved Date: Apr. 9, 2014, Available at: http://www.epson.com/cgi-bin/Store/jsp/Product/Specifications.do?sku=V11H423020.

Lang, Derrik J., "Oculus VR Seek to Revolutionize Virtual Reality with the Oculus Rift", Published on: Mar. 29, 2013, Available at: http://www.huffingtonpost.com/2013/03/29/oculus-rift-virtual-reality-goggles_n_2978094.html.

"Google Glasses", Retrieved Date: Apr. 9, 2014, Available at: http://www.google.com/glass/start/.

"GlassUp Glasses", Retrieved Date: Jul. 11, 2014, Available at: http://www.glassup.net/features.html.

"i-Glasses", Retrieved Date: Jul. 11, 2014, Available at: http://www.i-glassesstore.com/i-3d.html.

"ORA by Optinvent," Retrieved Date: Jul. 11, 2014, Available at: http://www.optinvent.com/see-through-glasses-ORA.

Naijoh, Yoshihisa, et al., "Multi-Layered Electrochromic Display," RICOH Company Ltd., Retrieved Date: Jul. 11, 2014, 4 pages, Available at: https://www.ricoh.com/ja/technology/tech/pdf/EP1-1.pdf.

Yashiro, Tohru, et al., "Flexible Electrochromic Display," RICOH Company Ltd., Retrieved Date: Jul. 11, 2014, 4 pages, Available at: https://www.ricoh.com/ja/technology/tech/pdf/EP2-1.pdf.

"International Search Report & Written Opinion Issued in PCT Application No. PCT/US2015/045779", Mailed Date Dec. 10, 2015, 26 Pages. (MS# 355153.02).

* cited by examiner

| dimming module | one cell | two cell | three cell | four cell |
|---|---|---|---|---|
| transmissive state | 83.7% | 70% | 58.6% | 49.0% |
| darkened state | 4% | 0.2% | 0.0064% | 0.0003% |

TABLE I

DIMMING MODULE FOR AUGMENTED AND VIRTUAL REALITY

BACKGROUND

A near-eye display (NED) device may be worn by a user for experiences such as an augmented reality (AR) experience and a virtual reality (VR) experience. A NED device may include a display module that may provide a computer-generated image (CGI), or other information, in a near-eye display of the NED device. In an AR experience, a near-eye display of a NED device may include optical see-through lens to allow a CGI to be superimposed on a real-world view of a user.

A NED device may be included in a head-mounted display (HMD). A HMD having a NED device may be in the form of a helmet, visor, glasses, and goggles or attached by one or more straps. HMDs may be used in at least aviation, engineering, science, medicine, computer gaming, video, sports, training, simulations and other applications.

SUMMARY

The technology provides embodiments of a dimming module for a near-eye display (NED) device that controls an amount of ambient light that passes through the transmissive (or optical see-through) near-eye display to a user. The dimming module includes at least one electrochromic cell that enables variable density dimming (or selectable dimming levels/ambient light transmission percentages) so that the NED device may be used in an augmented reality (AR) and/or virtual reality (VR) application. An AR application may prefer partial dimming of ambient light or a transmissive (clear) state, while a VR application may prefer a darkened (opaque) state. A NED device having a dimming module may be included in a visor, or other type of head-mounted display (HMD). A NED device may be disposed by a support structure of a HMD, such as a frame of a visor or glasses.

In an embodiment, the dimming module includes at least one monochromic electrochromic cell with stacked layers of material. The stacked layers include layers of, a monochrome electrochromic compound and an insulator sandwiched between a pair of transparent substrates and conductors. In an embodiment, the transparent substrates may be lens of a HMD. An amount of current may be applied from a control circuit to the conductor layers to control an amount of dimming in response to a dimming value. The dimming value may be determined based upon an ambient light value from an ambient light sensor, user preference value, type of executing application, near-eye display brightness value, dimming module neutral density (ND) range (dimmable range) and near-eye display brightness range, singly or in combination. In an embodiment, multiple monochromic electrochromic cells may be stacked and used to increase a dimmable range.

The technology provides one or more apparatus embodiments. In an embodiment, an apparatus comprises a support structure, a near-eye display to provide image light and a dimming module. The dimming module comprises: a first transparent substrate, a first transparent conductor, a monochrome electrochromic compound, an insulator, a second transparent conductor and a second transparent substrate. The dimming module controls light passing through the dimming module in response to a current applied between the first and second transparent conductors.

The technology also provides one or more embodiments of a method comprising sensing an ambient light value associated with an amount of ambient light received by a transmissive near-eye display. An application is executed to provide image light to the transmissive near-eye display. A near-eye display brightness value associated with the application is retrieved and a dimming value for a dimming module is determined in response to the ambient light value and the near-eye display brightness value. The amount of ambient light that passes through the dimming module is limited in response to the dimming value.

The technology also provides one or more embodiments including a computing system and a HMD having a near-eye display. The computing system provides an electronic signal representing image data. The HMD provides image data in response to the electronic signal. The HMD includes a NED device comprising a display engine to output the image data, a transmissive near-eye display to provide image light in response to the image data, a dimming module and a control circuit. The dimming module controls an amount of ambient light that passes through the dimming module in response to a current. The control circuit provides the current in response to a dimming value.

In an embodiment, a dimming module comprises first and second transparent conductors and a monochrome electrochromic cell. Current is applied to the first and second conductors from a control circuit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
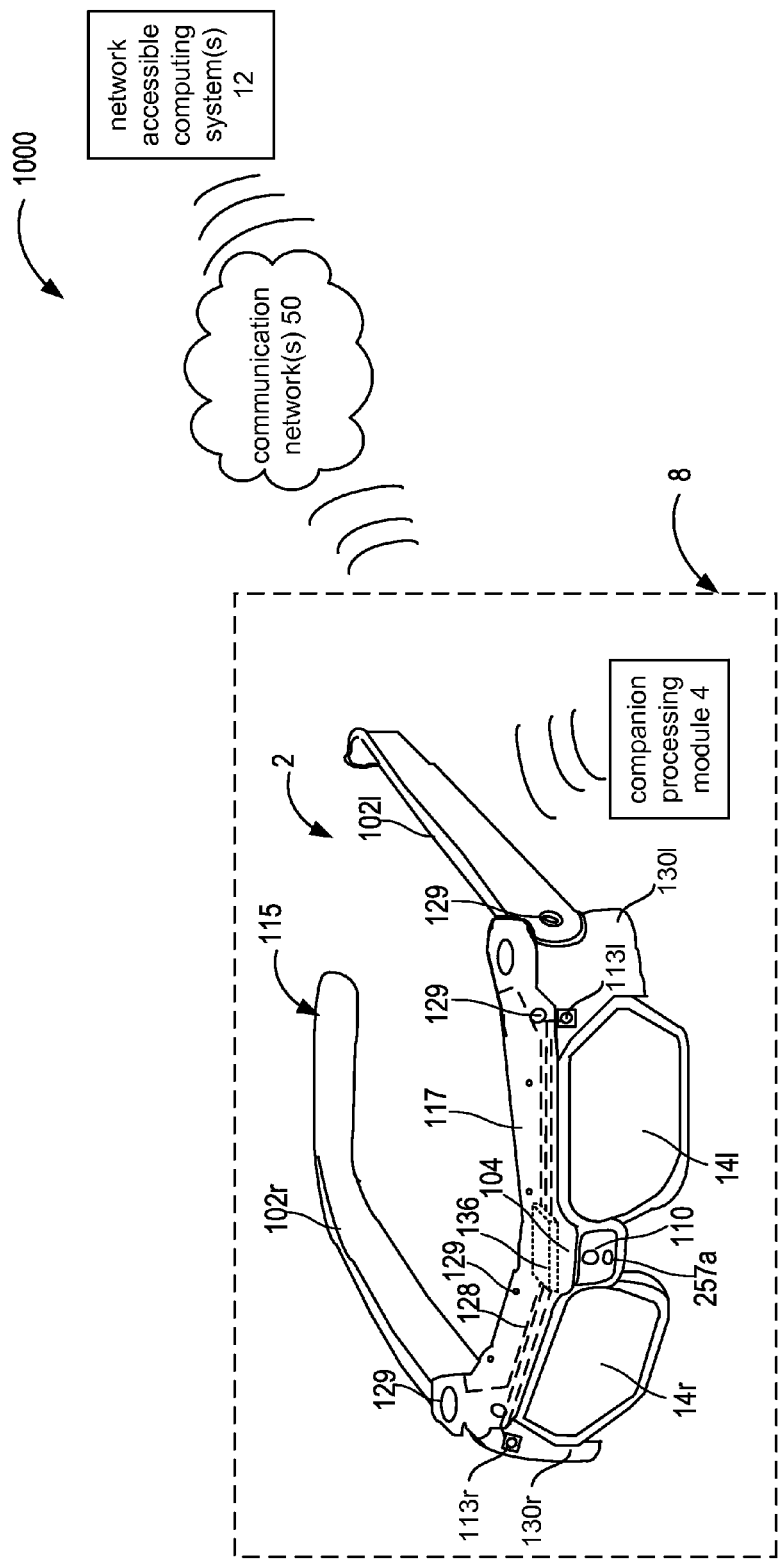
FIG. 1 is a block diagram depicting example components of an embodiment of a near-eye display (NED) device system.

The technology provides embodiments of a dimming module for a NED device that controls an amount of ambient light that passes through the transmissive (or optical see-through) near-eye display to a user. The dimming module includes at least one electrochromic cell that enables variable density dimming (or selectable dimming levels/ambient light transmission percentages) so that the NED device may be used in an AR and/or VR application. An AR application may prefer partial dimming of ambient light or a transmissive (clear) state, while a VR application may prefer a darkened (opaque) state. A NED device having a dimming module may be included in a visor, or other type of HMD. A NED device may disposed by a support structure of a HMD, such as a frame of a visor or glasses or internal supporting structures, such as the structure supporting a NED display module waveguide.

A HMD, such as glasses, used for VR applications block out the wearer's ambient light environment, enabling them to see the virtual content (or images) without impediment of ambient light from nearby lamps, windows, etc. However for AR applications, it may be important for a user to see the ambient environment with augmented imagery in some applications. For example in an AR application, a user may wish to view image data, such as direction guidance, while walking down a hallway to a meeting.

In an embodiment, a HMD having a dimming module may be used for both AR and VR applications. A dimming module embodiment controls the amount of ambient light for the AR application while blocking the ambient light for the VR applications. In an embodiment, a dimming module may also have variable density levels because different HMDs may have different near-eye display brightness ranges for AR images due to different display technologies and battery capabilities. A dimming module embodiment may then regulate the ambient illuminance so users can see a range of tones in the augmented imagery in a HMD having a particular near-eye display brightness range. In an embodiment, a dimming module may have a dimming range from fully (or almost dark to fully (or almost completely) transmissive.

In embodiments, a dimming module includes at least one monochrome electrochromic cell. The dimming module may be formed in a curve shape to wrap around a user's field of view (FOV). The dimming module may have relatively low power consumption so as to minimize the weight of batteries used in a HMD. Also, a dimming module may have a relatively quick response time, such as about 100 ms, and may not create excessive heat that may interfere with lightweight plastic support structures that may be used in HMDs.

In an embodiment, a monochrome electrochromic cell in the dimming module includes a plurality of materials formed in stacked layers. In embodiments, a dimming module includes a plurality of monochrome electrochromic cells oriented in stacked manner so as to increase a dimming range toward the darkened state. In an embodiment, a monochrome electrochromic cell has one or more particular materials that change color or opacity when a charge or current is applied. The charge causes ion migration from one area to another, causing a decided change in the material's visible characteristics. Electrochromic cells may have faster or slower switching speed than liquid crystal display (LCD) materials.

In an embodiment, a monochrome electrochromic cell has process temperatures that may not exceed about 120 C, so as to be adaptable to lightweight plastic substrates. In an embodiment, a monochrome electrochromic cell does not include an active matrix thin-film transistor (TFT) backplane and/or reflective layer, such as Titanium dioxide ($TiO_2$).

FIG. 1 is a block diagram depicting example components of an embodiment of a near-eye display (NED) device system 8 having a dimming module. In the illustrated embodiment, a NED device system 8 includes a near-eye display (NED) device in a head-mounted display (HMD) device 2 and companion processing module 4. HMD 2 is communicatively coupled to companion processing module 4. Wireless communication is illustrated in this example, but communication via a wire between companion processing module 4 and HMD 2 may also be implemented. In an embodiment, HMD 2 includes a NED device having a projection light engine 120 and near-eye display 14r-1 (both shown in FIG. 3) having a waveguide as described in detail herein.

In this embodiment, HMD 2 is in the shape of eyeglasses having a frame 115, with each display optical system 14l and 14r positioned at the front of the HMD 2 to be seen through by each eye when worn by a user. Each display optical system 14l and 14r is also referred to as a display or near-eye display 14, and the two display optical systems 14l and 14r together may also be referred to as a display or near-eye display 14.

In an embodiment, near-eye display 14 is a transmissive (or optical see-through) near-eye display in which a user may see through the near-eye display. In an embodiment, near-eye display 14 is curved so as to wraps around a user's visual FOV. In this embodiment, each display optical system 14l and 14r uses a projection display in which image data (or image light) is projected to generate a display of the image data so that the image data appears to the user at a location in a three dimensional FOV in front of the user. For example, a user may be playing a shoot down enemy helicopter game in an optical see-through mode in his living room. An image of a helicopter appears to the user to be flying over a chair in his living room, not between optional see-through lenses 116 and 118, shown in FIG. 3, as a user cannot focus on image data that close to the human eye.

Figure 2:
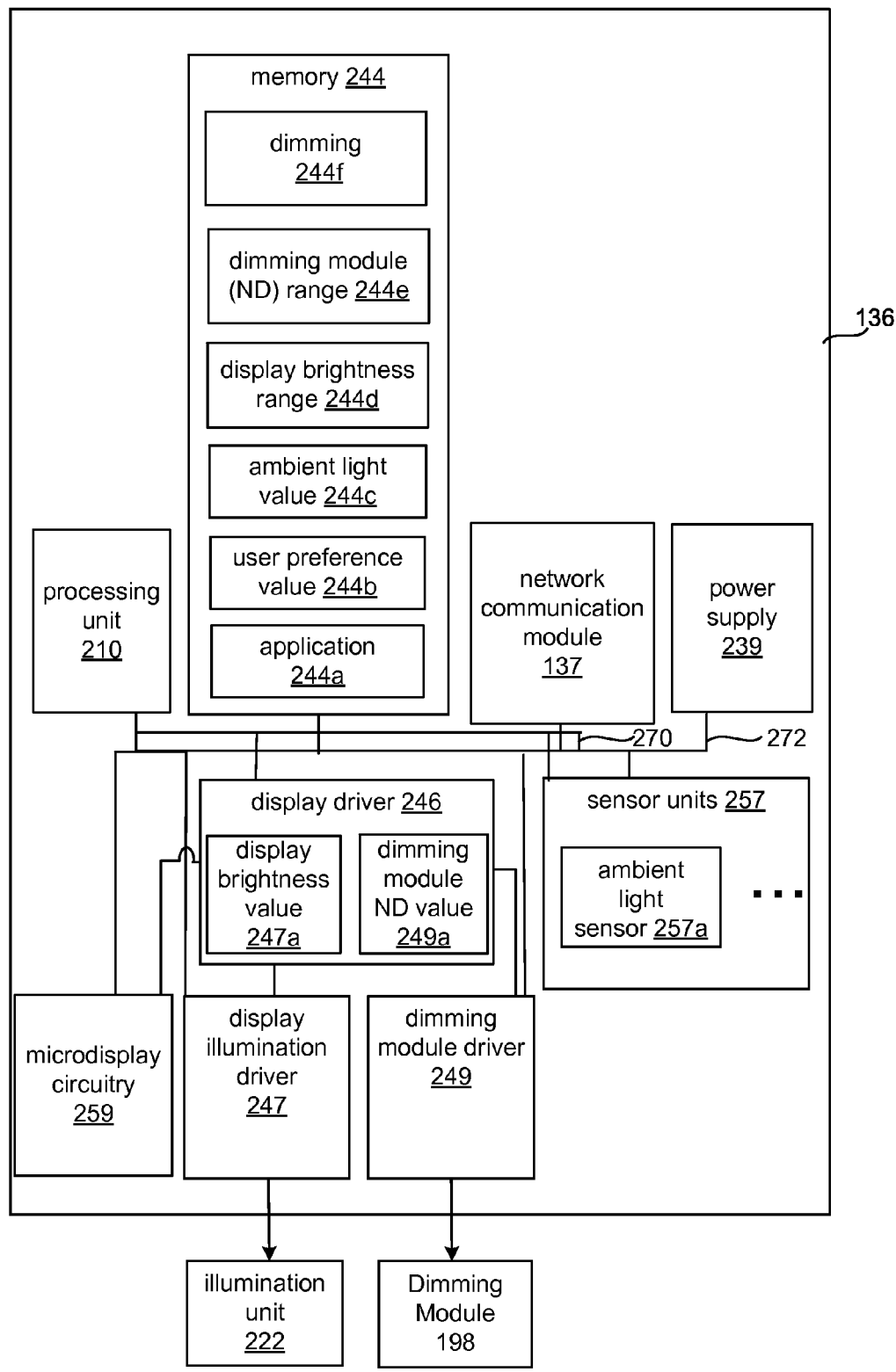
FIG. 2 is a block diagram of example hardware components in control circuitry of a NED device.

In this embodiment, frame 115 provides a convenient eyeglass frame holding elements of the HMD 2 in place as well as a conduit for electrical connections. In an embodiment, frame 115 provides a support structure for a projection light engine 120 and a near-eye display 14 as described herein. Some other examples of NED device support structures are a helmet, visor frame, goggles support or one or more straps. The frame 115 includes a nose bridge 104, a front top cover section 117, a respective projection light engine housing 130 for each of a left side housing (130l) and a right side housing (130r) of HMD 2 as well as left and right temples or side arms 102l and 102r which are designed to rest on each of a user's ears. In this embodiment, nose bridge 104 includes a microphone 110 for recording sounds and transmitting audio data to control circuit 136. In an embodiment, an ambient light sensor 257a is also disposed in nose bridge 104 to sense ambient light and provide an ambient light value 244c to memory 244 in control circuit 136 (as shown in FIG. 2). On the exterior of the side housing 130l and 130r are respective outward facing cameras 113l and 113r which capture image data of the real environment in front of the user for mapping what is in a FOV of a near-eye display (NED) device.

In this embodiment, dashed lines 128 are illustrative examples of some electrical connection paths which connect to control circuit 136, also illustrated in dashed lines. One dashed electrical connection line is labeled 128 to avoid overcrowding the drawing. The electrical connections and control circuit 136 are in dashed lines to indicate they are under the front top cover section 117 in this example. There may also be other electrical connections (not shown) including extensions of a power bus in the side arms for other components, some examples of which are sensor units including additional cameras, audio output devices like earphones or units, and perhaps an additional processor and memory. Some examples of connectors 129 as screws are illustrated which may be used for connecting the various parts of the frame together.

Figure 9:
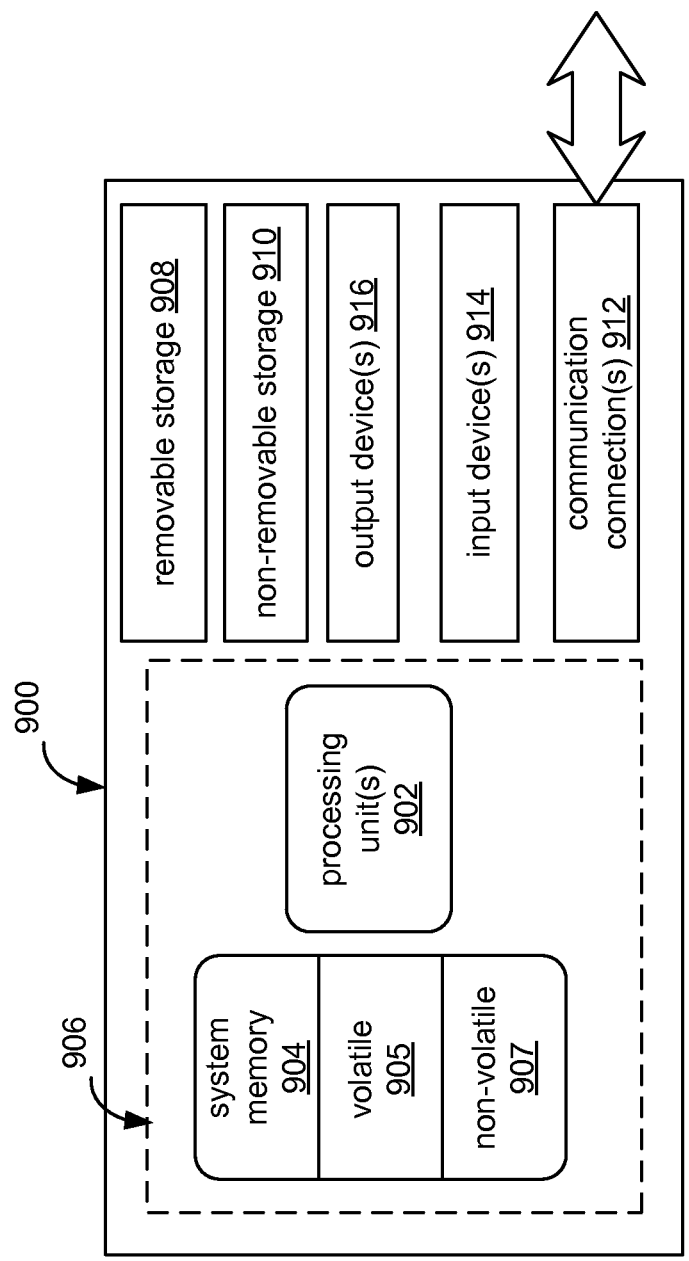
FIG. 9 is a block diagram of one embodiment of a computing system that can be used to implement a network accessible computing system, a companion processing module or control circuitry of a NED device.

The companion processing module 4 may take various embodiments. In some embodiments, companion processing module 4 is in a portable form which may be worn on the user's body, e.g. a wrist, or be a separate portable computing system like a mobile device (e.g. smartphone, tablet, laptop). The companion processing module 4 may communicate using a wire or wirelessly over one or more communication network(s) 50 to one or more network accessible computing system(s) 12, whether located nearby or at a remote location. In other embodiments, the functionality of the companion processing module 4 may be integrated in software and hardware components of HMD 2. Some examples of hardware components of the companion processing module 4 and network accessible computing system(s) 12 are shown in FIG. 9.

One or more network accessible computing system(s) 12 may be leveraged for processing power and remote data access. The complexity and number of components may vary considerably for different embodiments of the network accessible computing system(s) 12 and the companion processing module 4. In an embodiment illustrated in FIG. 1, a NED device system 1000 may include near-eye display (NED) device system 8 (with or without companion processing module 4), communication network(s) 50 and network accessible computing system(s) 12. In an embodiment, network accessible computing system(s) 12 may be located remotely or in a Cloud operating environment.

Image data is identified for display based on an application (e.g. a game, conferencing application, movie playing application, messaging application) executing on one or more processors in control circuit 136, companion processing module 4 and/or network accessible computing system(s) 12 (or a combination thereof) to provide image data to near-eye display 14.

FIG. 2 is a block diagram of example hardware components including a computing system within a control circuit of a NED device. Control circuit 136 provides various electronics that support the other components of HMD 2. In this example, the control circuit 136 for a HMD 2 comprises a processing unit 210 and a memory 244 accessible to the processing unit 210 for storing processor readable instructions and data. A network communication module 137 is communicatively coupled to the processing unit 210 which can act as a network interface for connecting HMD 2 to another computing system such as the companion processing module 4, a computing system of another NED device or one which is remotely accessible over the Internet. A power supply 239 provides power for the components of the control circuit 136 and the other components of the HMD 2 like the capture devices 113, the microphone 110, ambient light sensor 257a, other sensor units, and for power drawing components for displaying image data on near-eye display 14 such as light sources and electronic circuitry associated with an image source like a microdisplay in a projection light engine 120.

The processing unit 210 may comprise one or more processors (or cores) such as a central processing unit (CPU) or core and a graphics processing unit (GPU) or core. In embodiments without a separate companion processing module 4, processing unit 210 may contain at least one GPU. Memory 244 is representative of the various types of memory which may be used by the system such as random access memory (RAM) for application use during execution, buffers for sensor data including captured image data, ambient light data and display data, read only memory (ROM) or Flash memory for instructions and system data, and other types of nonvolatile memory for storing applications and user profile data, for example.

In an embodiment, memory 244 includes processor readable information, such as digital data values or processor readable instructions. For example, memory 244 may include at least a portion of an application 244a that may be executing. Memory 244 may also include a user preference value 244b that indicates a user preference of a dimming value or dimming environment for HMD 2. A user may indicate their preference, as described in detail herein, by making a speech command to a natural language user interface (NUI), such as: "Dim more" or "Dim less." In this embodiment, a stored user preference value 244b may be increased or decreased by a predetermined step size which then may result in the dimming module increasing or decreasing dimming Memory 244 also includes an ambient light value 244c, received from ambient light sensor 257a, that indicates an amount of ambient light received by ambient light sensor 257a, or in particular an amount of ambient light received by an external curved surface 290 of near-eye display 14l (shown in FIG. 3). Memory 244 may also include a near-eye display brightness range 244d and dimming module neutral density (ND) range 244e. Memory 244 may also include a dimming (software component) 244f to calculate or determine a dimming value based on one or more inputs, such as user preference value 244b, dimming module density (ND) value 249a, display brightness range 244d and/or ambient light value 244c.

In an embodiment, display brightness range 244d represents the capable brightness or luminous range of a near-eye display 14. For example, a near-eye display may have a brightness (or luminance) range from zero candelas per square meter (cd/m$^2$) to 8000 cd/m$^2$. In an embodiment, dimming module ND range 244e represents the range of selectable dimming or transmission rates (or percentages) of ambient light traveling through a dimming module. In an example, dimming module ND range 244e may range from allowing approximately 4% transmission of ambient light (dark state) to allowing approximately 84% transmission of ambient light (clear or transmissive state) through a dimming module or near-eye display having a dimming module.

In alternate embodiments, digital data values and/or processor readable instructions illustrated FIG. 2, such as in memory 244, may be stored and/or executed in alternate locations in a NED device system 1000

FIG. 2 illustrates an electrical connection of a data bus 270 that connects sensor units 257, display driver 246, processing unit 210, memory 244, and network communication module 137. Data bus 270 also derives power from power supply 239 through a power bus 272 to which all the illustrated elements of the control circuit are connected for drawing power.

In an embodiment, control circuit 136 may include circuits that are specific to particular types of image generation or near-eye display technologies. For example, control circuit 136 may include microdisplay circuitry 259 and display illumination driver 247 for a microdisplay describe in detail below. In alternate embodiments, other types of control circuits may be used in control circuit 136 for different near-eye display technologies, such as a retina scanning display (RSD) that does not have a microdisplay in an embodiment. In a RSD embodiment, a RSD would receive electronic signals from a display engine rather than a projection light engine. A RSD would then provide image light to a user's retina by scanning image light in response to image data from a display engine.

Control circuit 136, in at least a microdisplay embodiment, comprises a display driver 246 for receiving digital control data (e.g. control bits) to guide reproduction of image data that may be decoded by microdisplay circuitry 259, display illumination driver 247 and dimming module driver 249. Display illumination driver drives an illumination unit 222 (in a projection light engine) in response to a display brightness value 247a in an embodiment. A projection light engine may include a microdisplay that may be an active transmissive, emissive or reflective device. For example, a microdisplay may be a liquid crystal on silicon (LCoS) device requiring power or a micromechanical machine (MEMs) based device requiring power to move individual mirrors. In an embodiment, a display illumination driver 247 converts digital control data to analog signals for driving an illumination unit 222 which includes one or more light sources, such as one or more lasers or light emitting diodes (LEDs). In an embodiment, a display brightness value 247a is stored display driver 246. In an alternate embodiment, display brightness value 247a may be stored in memory 244. In an embodiment, display brightness values 247a represents the current display brightness of the near-eye display 14. In an embodiment, a near-eye display has brightness that corresponds to display brightness value 247a. In an embodiment, one or more drivers provide one or more analog signals to a near-eye display to provide a corresponding display brightness in response to a display brightness value 247a.

In an embodiment, control circuit 136 includes a dimming module driver 249 to drive dimming module 198 (shown in FIG. 3) in response to display driver 246. In an embodiment, display driver 246 stores a dimming module ND value 249a. In an alternate embodiment, dimming module ND value 249a is stored in memory 244. In an embodiment, dimming module driver 249 provides a predetermined amount of current for a predetermined amount of time to dimming module 198 in response to a dimming module ND value 249a or user preference value 244b. In an embodiment, dimming module driver 249 includes a table to store digital values associated with a predetermined amount of current to apply to dimming module 198 in response to corresponding digital values in dimming module ND value 249a.

The control circuit 136 may include other control units not illustrated here but related to other functions of a HMD 2 such as providing audio output, identifying head orientation and location information.

Figure 3:
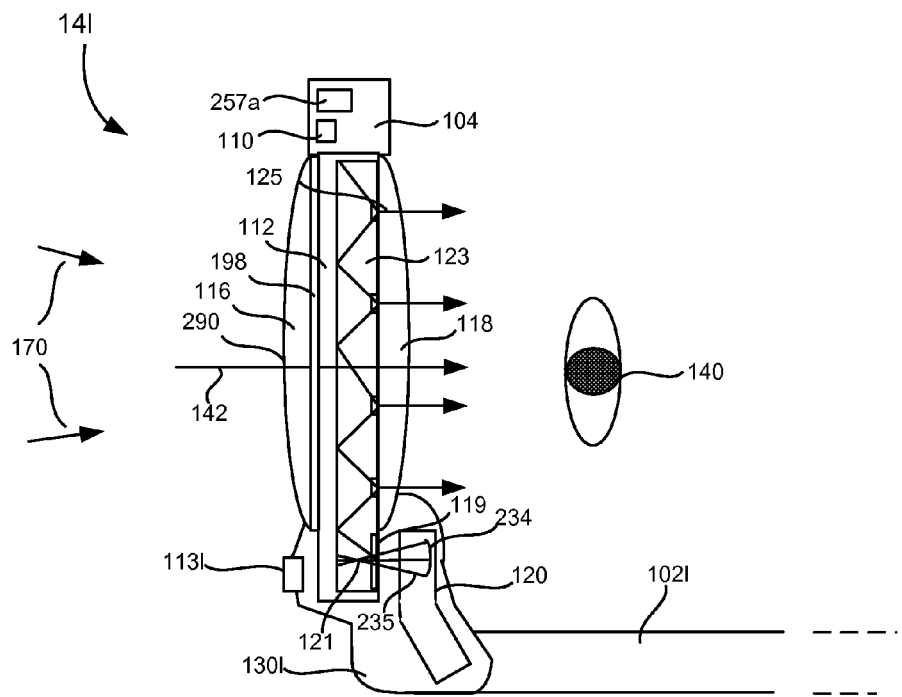
FIG. 3 is a top view of an embodiment of a near-eye display having a dimming module.

FIG. 3 is a top view of an embodiment of a near-eye display 14l being coupled with a projection light engine 120 having an external exit pupil 121. In order to show the components of the display optical system 14, in this case 14l for the left eye, a portion of the top frame section 117 covering the near-eye display 14l and the projection light engine 120 is not depicted. Arrow 142 represents an optical axis of the near-eye display 14l.

In an embodiment illustrated in FIG. 3, the near-eye displays 14l (and 14r) are optical see-through displays. In other embodiments, they can be video-see displays. Each display includes a display unit 112 illustrated between two optional see-through lenses 116 and 118 and including a waveguide 123. The optional see through lenses 116 and 118 serve as protective coverings and/or to form an image for the viewer at a comfortable visual distance, such as 1 m ahead, for the display unit. One or both of them may also be used to implement a user's eyeglass prescription. In this example, eye space 140 approximates a location of a user's eye when HMD 2 is worn. The waveguide directs image data in the form of image light from a projection light engine 120 towards a user eye space 140 while also allowing ambient 170 light from the real world to pass through towards a user's eye space, thereby allowing a user to have an actual direct view of the space in front of HMD 2 in addition to seeing an image of a virtual feature from the projection light engine 120.

In this top view, the projection light engine 120 includes a birdbath optical element 234 illustrated as a curved surface. The curved surface provides optical power to the beams 235 of image light it reflects, thus collimating them as well. Only one beam is labeled to prevent overcrowding the drawing. In some embodiments, the radius of curvature of the birdbath optical element is at least −38 millimeters (mm).

In some embodiments, a waveguide 123 may be a diffractive waveguide. Additionally, in some examples, a waveguide 123 is a surface relief grating (SRG) waveguide. An input grating 119 couples an image light from a projection light engine 120. Additionally, a waveguide has a number of exit gratings 125 for an image light to exit the waveguide in the direction of a user eye space 140. One exit grating 125 is labeled to avoid overcrowding the drawing.

In the illustrated embodiment of FIG. 3, the projection light engine 120 in a left side housing 130l includes an image source, for example a microdisplay, which produces the image light and a projection optical system which folds an optical path of the image light to form an exit pupil 121 external to the projection light engine 120. The shape of the projection light engine 120 is an illustrative example adapting to the shape of the example of left side housing 130l which conforms around a corner of the frame 115 in FIG. 1 reducing bulkiness. The shape may be varied to accommodate different arrangements of the projection light engine 120, for example due to different image source technologies implemented.

There are different image generation technologies that can be used to implement an image source. For example, a microdisplay can be implemented using a transmissive projection technology. In one example of such technology, a light source is modulated by optically active material: the material is usually implemented using transmissive LCD type microdisplays with powerful backlights and high optical energy densities. Other microdisplays use a reflective technology for which light from an illumination unit is reflected and modulated by an optically active material. The illumination maybe a white source or RGB source, depending on the technology. Digital light processing (DLP), digital micromirror device (DMD), and LCoS are all examples of reflective technologies which are efficient as most energy is reflected away from the modulated structure and may be used by the display. Additionally, a microdisplay can be self-emitting, such as a color-emitting organic light emitting diode (OLED) microdisplay or an array of LEDs. LED arrays may be created conventionally on gallium nitride (GaN) substrates with a phosphor layer for spectral conversion or other color conversion method. In an embodiment, a self-emissive display is relayed and magnified for a viewer.

FIG. 3 shows half of a HMD 2. For the illustrated embodiment, a full HMD 2 may include another display optical system 14 with another set of optional see-through lenses 116 and 118, another waveguide 123, as well as another projection light engine 120, and another of outward facing capture devices 113. In some embodiments, there may be a continuous display viewed by both eyes, rather than a display optical system for each eye. In some embodiments, a single projection light engine 120 may be optically coupled to a continuous display viewed by both eyes or be optically coupled to separate displays for the eyes. Additional details of a head mounted personal A/V apparatus are illustrated in U.S. patent application Ser. No. 12/905,952 entitled Fusing Virtual Content Into Real Content, Filed Oct. 15, 2010.

Figure 4:
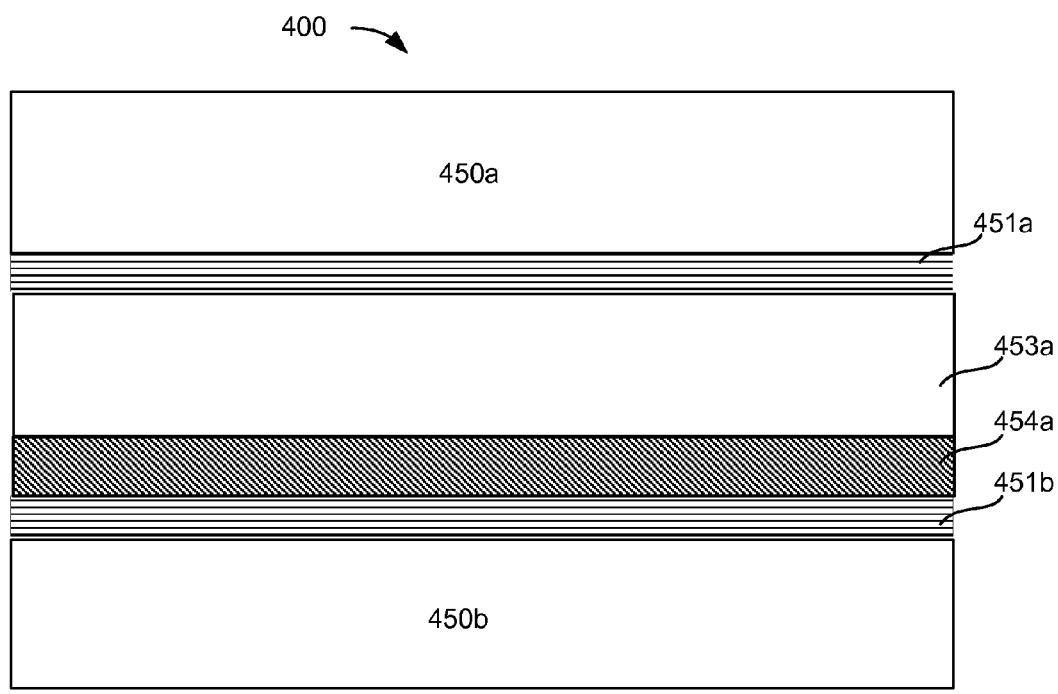
FIG. 4 illustrates a single monochrome cell in a dimming module used in a near-eye display.

FIG. 4 illustrates a monochrome electrochromic cell 400 used in a dimming module 198 according to an embodiment. In an embodiment, a dimming module 198 includes a single or a plurality of monochrome electrochromic cells. In embodiments, monochrome electrochromic cell 400 includes additional materials as well.

Monochrome electrochromic cell 400 includes a stacked plurality of layered substrates. In an embodiment, the stacked plurality of layered substrates are at least partially contiguous. In an alternate embodiment, one or more other material is interspersed between the depicted layers. Substrates 450a-b are a clear or transparent substrate layer in an embodiment. In embodiments, substrates 450a-b are an outer surface of dimming module 198 and are a moldable transparent material, such as (Poly)methyl methacrylate (PMMA), polycarbonate, glass or similar material. In an embodiment, substrates 450a-b correspond to lens 116 and 118 shown in FIG. 3. In an embodiment, substrates 451a-b are transparent conductive layers to conduct current. In an embodiment, substrates 451a-b include a material selected from a group consisting of Indium Tin Oxide, metal mesh, silver nanowires, carbon nanotubes, graphene and PEDOT: PSS (Poly(3,4-ethylenedioxythiophene)polystyrene sulfonate). In an embodiment, substrates 451a-b are coupled to a current source, such as dimming module driver 249 to receive a predetermined amount of current for a predetermined amount of time. In an embodiment, substrate 453a is a monochrome electrochromic compound layer. In an embodiment, substrate 454a is an insulator, such as silicon dioxide ($SiO_2$), and is disposed between substrate 453a and substrate 451b. In an embodiment, a substrate including an electrolyte is included in monochrome electrochromic cell 400.

In an embodiment, a monochrome electrochromic cell 400 has one or more particular materials that change color or opacity when a charge or current is applied. The charge causes ion migration from one area to another, causing a decided change in the material's visible characteristics.

In embodiments, monochrome electrochromic cell 400 is manufactured or processed using a variety of process steps. In an embodiment, one or more substrates are formed using one or more spin coating process steps. In an alternate embodiment, some substrates may be formed by a spin coating process step, while other substrates may be assembled or affixed to each other.

Figures 5, 6:
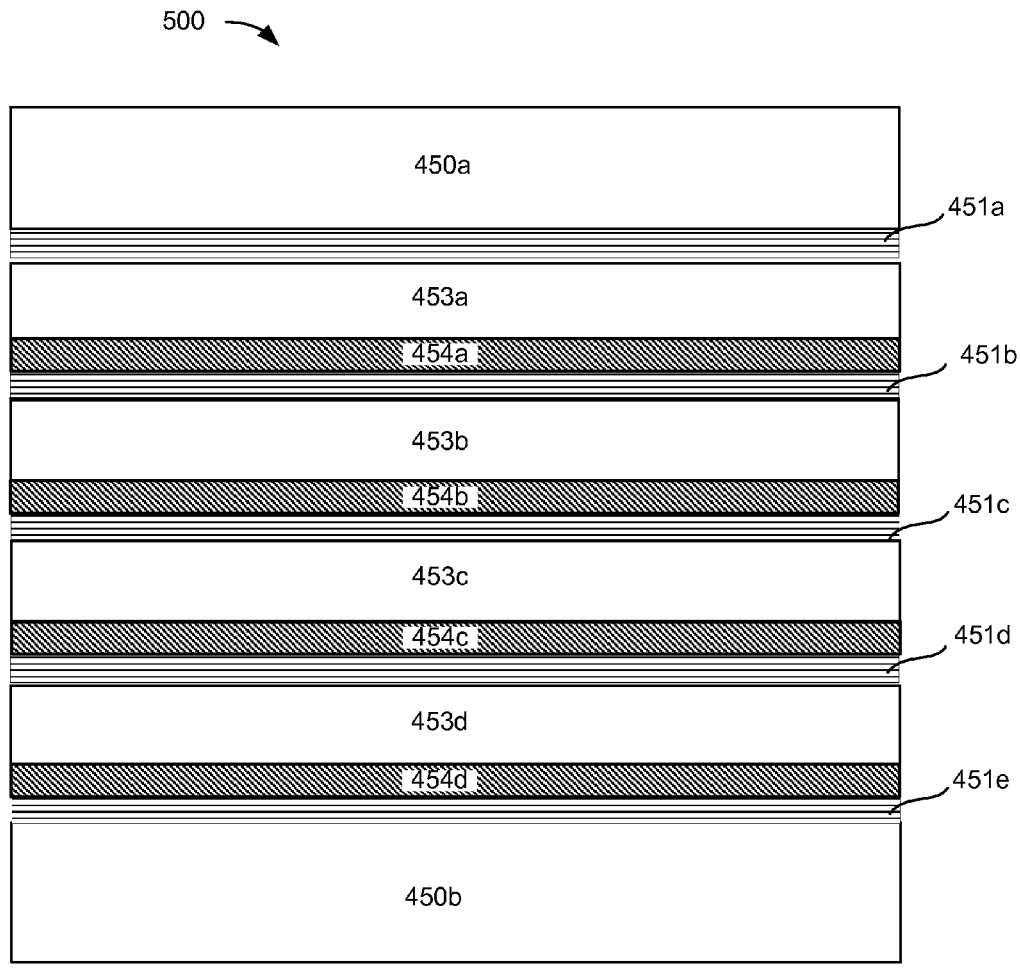
FIG. 5 illustrates multiple monochrome cells in a dimming module used in a near-eye display.
FIG. 6 is a table I illustrating dimming ranges for a dimming module having one to four monochrome cells in a dimming module.

FIG. 5 illustrates a multiple monochrome cell embodiment in a dimming module used in a near-eye display. In an embodiment, a dimming module 198 includes a plurality of monochrome electrochromic cells 500. Multiple monochrome cells may be used to increase a dimmable range toward a darkened state as illustrated in FIG. 6. In an embodiment, multiple monochrome cells may be used in an application when a relatively high darkened state is desirable and a relatively lower transmissive state is satisfactory.

Table I of FIG. 6 illustrates that a single monochrome cell may have a dimmable range of between approximately 4% (darkened state, 4% of ambient light is allowed to pass) to approximately 83.7% (transmissive state, 83.7% of ambient light is allowed to pass); a two monochrome cell may have a dimmable range of between approximately 0.2% (darkened state) to approximately 70% (transmissive state); a three monochrome cell may have a dimmable range of between approximately 0.0064% (darkened state) to approximately 58.6% (transmissive state); and a four monochrome cell may have a dimmable range of between approximately 0.0003% (darkened sate) to approximately 49.0% (transmissive state).

FIG. 5 illustrates a four monochrome cell embodiment or a plurality of monochrome electrochromic cells 500. In an embodiment, a plurality of monochrome electrochromic cells 500 include substrates 450a-b, 451a-b, 453a and 454a as similar described herein regarding a single monochrome cell 400 shown in FIG. 4. For example, substrates 450a-b are clear or transparent substrate layers in an embodiment. In embodiments, substrates 450a-b are an outer surface of dimming module 198 and are a moldable transparent material, such as (Poly)methyl methacrylate (PMMA), polycarbonate, glass or similar material.

In addition, a plurality of monochrome electrochromic cells 500 includes additional stacked substrates 451c-e that may also be transparent conductor substrates coupled to a controllable current source as described herein. Additional substrate layers 453b-d and 454b-d may be respective monochrome electrochromic compound layers and insulator layers, as similar described in regard to FIG. 4.

In an embodiment, the stacked plurality of layered substrates in a plurality of monochrome electrochromic cells 500 are at least partially contiguous. In an alternate embodiment, one or more other material is interspersed between the depicted layers.

A plurality of monochrome electrochromic cells 500, similar to a single monochrome cell 400, may be manufactured or processed using a variety of process steps. In an embodiment, one or more substrates are formed using one or more spin coating process steps. In an alternate embodiment, some substrates may be formed by a spin coating process step, while other substrates may be assembled or affixed to each other.

Figure 7:
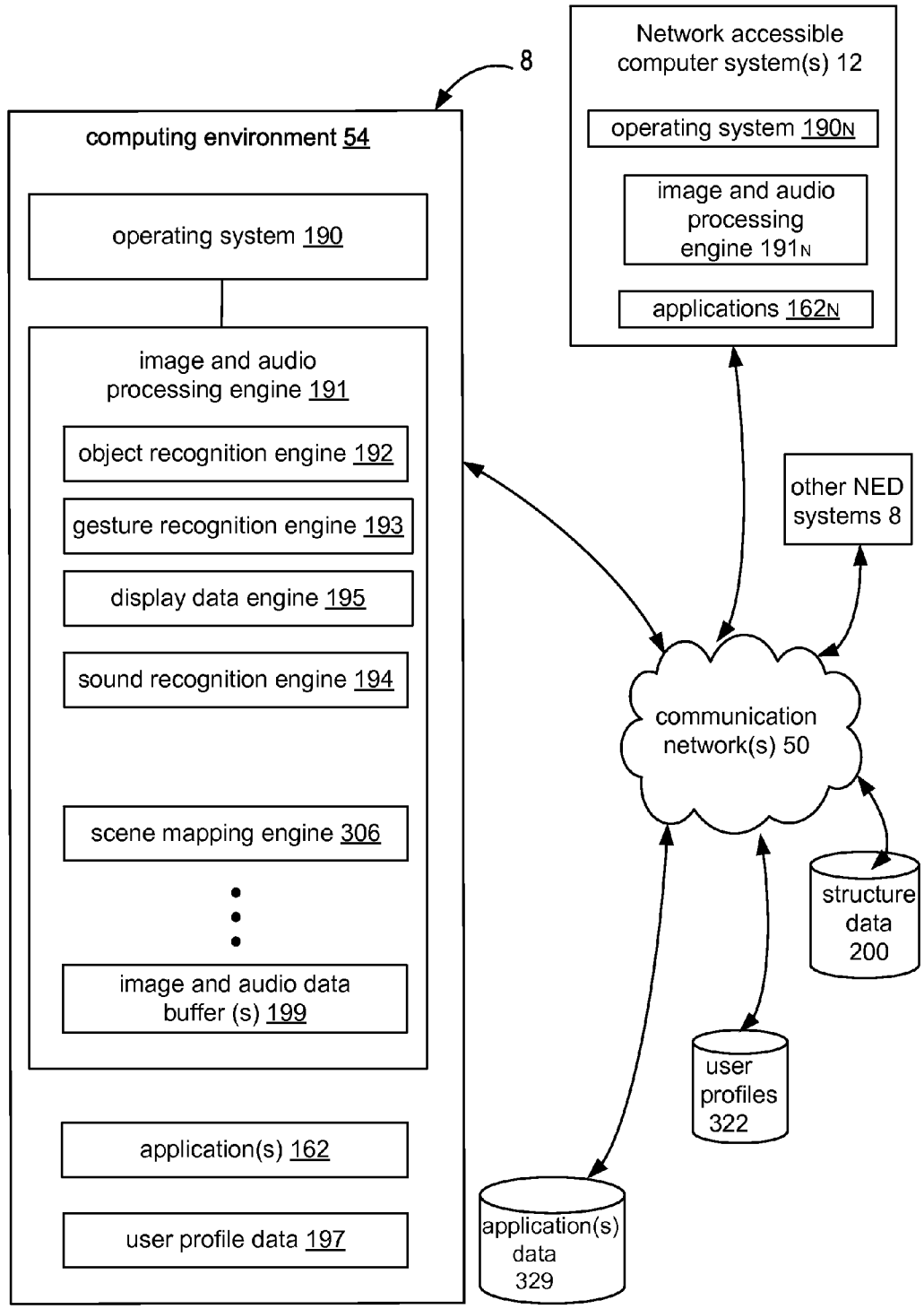
FIG. 7 is a block diagram of an embodiment of a system from a software perspective for displaying image data by a NED device having a dimming module.

FIG. 7 is a block diagram of an embodiment of a system from a software perspective for displaying image data or light (such as a CGI) by a near-eye display device. FIG. 7 illustrates an embodiment of a computing environment 54 from a software perspective which may be implemented by a system like NED system 8, network accessible computing system(s) 12 in communication with one or more NED systems or a combination thereof. Additionally, a NED system can communicate with other NED systems for sharing data and processing resources.

As described herein, an executing application determines which image data is to be displayed, some examples of which are text, emails, virtual books or game related images. In this embodiment, an application 162 may be executing on one or more processors of the NED system 8 and communicating with an operating system 190 and an image and audio processing engine 191. In the illustrated embodiment, a network accessible computing system(s) 12 may also be executing a version 162N of the application as well as other NED systems 8 with which it is in communication for enhancing the experience.

Application 162 includes a game in an embodiment. The game may be stored on a remote server and purchased from a console, computer, or smartphone in embodiments. The game may be executed in whole or in part on the server, console, computer, smartphone or on any combination thereof. Multiple users might interact with the game using standard controllers, computers, smartphones, or companion devices and use air gestures, touch, voice, or buttons to communicate with the game in embodiments.

Application(s) data 329 for one or more applications may also be stored in one or more network accessible locations. Some examples of application(s) data 329 may be one or more rule data stores for rules linking action responses to user input data, rules for determining which image data to display responsive to user input data, reference data for natural user input like for one or more gestures associated with the application which may be registered with a gesture recognition engine 193, execution criteria for the one or more gestures, voice user input commands which may be registered with a sound recognition engine 194, physics models for virtual objects associated with the application which may be registered with an optional physics engine (not shown) of the image and audio processing engine 191, and object properties like color, shape, facial features, clothing, etc. of the virtual objects and virtual imagery in a scene.

As shown in FIG. 7, the software components of a computing environment 54 comprise the image and audio processing engine 191 in communication with an operating system 190. The illustrated embodiment of an image and audio processing engine 191 includes an object recognition engine 192, gesture recognition engine 193, display data engine 195, a sound recognition engine 194, and a scene mapping engine 306. The individual engines and data stores provide a supporting platform of data and tasks which an application(s) 162 can leverage for implementing its one or more functions by sending requests identifying data for processing and receiving notification of data updates. The operating system 190 facilitates communication between the various engines and applications. The operating system 190 makes available to applications which objects have been identified by the object recognition engine 192, gestures the gesture recognition engine 193 has identified, which words or sounds the sound recognition engine 194 has identified, and the positions of objects, real and virtual from the scene mapping engine 306.

The computing environment 54 also stores data in image and audio data buffer(s) 199 which provide memory for image data and audio data which may be captured or received from various sources as well as memory space for image data to be displayed. The buffers may exist on both the NED, e.g. as part of the overall memory 244, and may also exist on the companion processing module 4.

In many applications, virtual data (or a virtual image) is to be displayed in relation to a real object in the real environment. The object recognition engine 192 of the image and audio processing engine 191 detects and identifies real objects, their orientation, and their position in a display FOV based on captured image data and captured depth data from outward facing image capture devices 113 if available or determined depth positions from stereopsis based on the image data of the real environment captured by the capture devices 113. The object recognition engine 192 distinguishes real objects from each other by marking object boundaries, for example using edge detection, and comparing the object boundaries with structure data 200. Besides identifying the type of object, an orientation of an identified object may be detected based on the comparison with stored structure data 200. Accessible over one or more communication network(s) 50, structure data 200 may store structural information such as structural patterns for comparison and image data as references for pattern recognition. Reference image data and structural patterns may also be available in user profile data 197 stored locally or accessible in Cloud based storage.

The scene mapping engine 306 tracks the three dimensional (3D) position, orientation, and movement of real and virtual objects in a 3D mapping of the display FOV. Image data is to be displayed in a user's FOV or in a 3D mapping of a volumetric space about the user based on communications with the object recognition engine 192 and one or more executing application(s) 162 causing image data to be displayed.

An application(s) 162 identifies a target 3D space position in the 3D mapping of the display FOV for an object represented by image data and controlled by the application. For example, the helicopter shoot down application identifies changes in the position and object properties of the helicopters based on the user's actions to shoot down the virtual helicopters. The display data engine 195 performs translation, rotation, and scaling operations for display of the image data at the correct size and perspective. The display data engine 195 relates the target 3D space position in the display FOV to display coordinates of the display unit 112. For example, the display data engine may store image data for each separately addressable display location or area (e.g. a pixel, in a Z-buffer and a separate color buffer). The display driver 246 translates the image data for each display area to digital control data instructions for microdisplay circuitry 259 or the display illumination driver 247 or both for controlling display of image data by the image source.

The technology described herein may be embodied in other specific forms or environments without departing from the spirit or essential characteristics thereof. Likewise, the particular naming and division of modules, engines routines, applications, features, attributes, methodologies and other aspects are not mandatory, and the mechanisms that implement the technology or its features may have different names, divisions and/or formats.

The technology described herein may be embodied in a variety of operating environments. For example, NED system 8 and/or network accessible computing system(s) 12 may be included in an Internet of Things (IoT) embodiment. The IoT embodiment may include a network of devices that may have the ability to capture information via sensors. Further, such devices may be able to track, interpret, and communicate collected information. These devices may act in accordance with user preferences and privacy settings to transmit information and work in cooperation with other devices. Information may be communicated directly among individual devices or via a network such as a local area network (LAN), wide area network (WAN), a "cloud" of interconnected LANs or WANs, or across the entire Internet. These devices may be integrated into computers, appliances, smartphones wearable devices, implantable devices, vehicles (e.g., automobiles, airplanes, and trains), toys, buildings, and other objects.

The technology described herein may also be embodied in a Big Data or Cloud operating environment as well. In a Cloud operating environment, information including data, images, engines, operating systems, and/or applications described herein may be accessed from a remote storage device via the Internet. In an embodiment, a modular rented private cloud may be used to access information remotely. In a Big Data operating embodiment, data sets have sizes beyond the ability of typically used software tools to capture, create, manage, and process the data within a tolerable elapsed time. In an embodiment, image data may be stored remotely in a Big Data operating embodiment.

There are a variety of ways or embodiments a NED device having a dimming module may operate with different applications. For example, a user may, but not limited to: 1) play an AR video game; 2) watch a movie; 3) teleconference; and/or 4) view messages or documents. In embodiments, the following examples may include methods of operating a NED device that may include one or more steps illustrated in FIGS. 8A-D described in detail herein.

In a first example, a user is playing an AR game using a NED device. In this example, an ambient light sensor from a HMD having a NED device, such as ambient light sensor 257a, senses an ambient light environment of 50 lux. This is an ambient light level that this particular NED device having a dimming module can match. Accordingly, for this particular AR game being played on this particular NED device, no dimming is needed. The display brightness level is set to match AR content to the same visual brightness as the user's environment and a dimming module of the NED device is set to the highest transmission state.

In an embodiment using hardware components of FIG. 2, the 50 lux value in the above example is stored as ambient light value 244c in memory 244 and application 224a corresponds to the AR game Dimming 244f executed by processing unit 210 compares this 50 lux value with display brightness range 244d in memory 244. Dimming 244f then determines that dimming module ND value 249a may be set to a full transmission state value or at the full transmission state value in dimming module (ND) range 244e. A display brightness value 247a, in display driver 246, is also set by the AR game.

In a second example, a user is playing a movie in an airplane using a NED device having a dimming module. For a movie application, or a movie player application, it is desirable to block out the user's environment and provide them with a clean background for the movie. In this example, a dimming module in a NED device is set to a fully darkened state or lowest transmission state.

In an embodiment using the hardware components of FIG. 2, dimming 244f executed by processing unit 210 would determine a type of application to be executed, such as a movie player application, and then set a dimming module ND value 249a to a full darkened state value or at the full darkened state value in dimming module (ND) range 244e. In an embodiment, a movie player application corresponds to application 244a and provides its type to dimming 244f.

In a third example, a user is teleconferencing with another person on a NED device having a dimming module while also viewing a CGI. The user wants to be able to see the person they are speaking to along with the CGI or document during the teleconference. The user has set an ambient light user preference for the teleconferencing application such that the user may easily also see their environment as well.

An ambient light sensor, such as ambient light sensor 257a, senses an ambient light environment of 3000 lux and stores a corresponding value in ambient light value 244c. This particular NED display cannot generate a brightness level greater than 800 cd/m$^2$ (as determined by display brightness range 244d in an embodiment), so the dimming module is used to filter the environment to a brightness level that the displayed information can match. A processor, such as processing unit 210, makes the following calculation to determine a dimming value (such as dimming module ND value 249a) after comparing the ambient light value to a display brightness range:

% (Dimming value)=Display brightness highest range value/(ambient light value/pi) or 83.7%
(Dimming value)=800 cd/m$^2$/(3000/3.14159)

The calculated or determined dimming value, 83.7%, is within the density range of the dimming module (or compared with dimming module ND range 244e), so the desired dimming level is converted to a dimming module drive level (or dimming module ND value 249a in an embodiment). When the dimming level is beyond the dimming module capability (or beyond dimming module ND range 244e), the dimming level is set to the closest level within capabilities. The dimming module drive level (or dimming module ND value 249a in an embodiment) is then determined by mapping the desired density result through the dimming module's drive vs. density characteristic function. In an embodiment, this calculation may be done with look-up table in display driver 246. Accordingly, the dimming module and the display brightness may both be set to their desired states.

In a fourth example, an office worker has abandoned their multiple desktop monitors for a virtual monitor application provided by a NED device having a dimming module. The user's preference is to have the NED device have partial dimming, so that the user can see people who stop by yet allow the virtual monitor to dominate the user's visual attention—not the items on the user's wall or what's going on out the window. As described herein, an ambient light sensor may sense an ambient light value of 400 lux. A processor, as described herein, may then calculate or determine a dimming value (or dimming module ND value 249a in an embodiment) based on the ambient light value and user preference value for the virtual monitor application. For example, a user preference value and dimming module may cause the ambient light for this particular NED device to be reduced or limited by 50% when using the virtual monitor application with the above ambient light.

FIGS. 8A-D are flowcharts of embodiment of methods for operating a NED device having a dimming module and/or system having a dimming module. The steps illustrated in FIGS. 8A-D may be performed by hardware components, software components and a user, singly or in combination. For illustrative purposes, the method embodiments below are described in the context of the system and apparatus embodiments described above. However, the method embodiments are not limited to operating in the system embodiments described herein and may be implemented in other system embodiments. Furthermore, the method embodiments may be continuously performed while the NED system is in operation and an applicable application is executing.

Figure 8A:
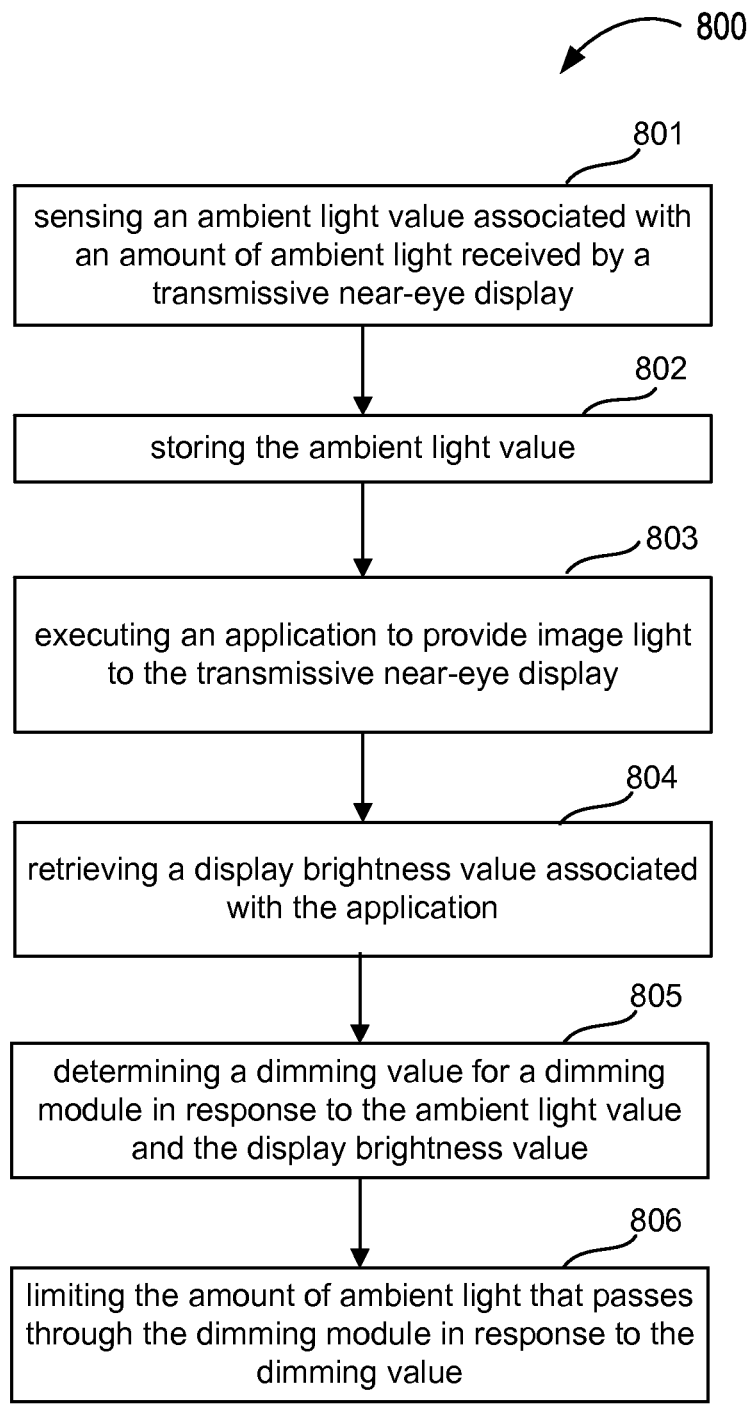
FIGS. 8A-D are flowcharts of embodiments of methods for operating a NED device and/or NED device system having a dimming module.

Step 801, of method 800 shown in FIG. 8A, begins by sensing an ambient light value associated with an amount of ambient light received by a transmissive near-eye display. In an embodiment, ambient light sensor 257a senses ambient light 170 shown in FIGS. 1 and 2.

Step 802 illustrates storing the ambient light value. In an embodiment, ambient light value 244c is stored in memory 244 as illustrated in FIG. 2. In an alternate embodiment, step 802 may be omitted and the ambient light value is not stored.

Step 803 illustrates executing an application to provide image light to the transmissive near-eye display. In an embodiment, application 244a is executed by at least processing unit 210 as illustrated in FIG. 2.

Step 804 illustrates retrieving a display brightness value associated with the application. In an embodiment, a display brightness value may be obtained from application 244a or from display brightness value 247a in display driver 246.

Step 805 illustrates determining a dimming value for a dimming module in response to the ambient light value and the display brightness value. In embodiments, a software component, such as dimming 244f being executed by processing unit 210 determines a dimming value for dimming module 198 and stores the value as dimming module ND value 249a in display driver 246.

Step 806 illustrates limiting the amount of ambient light that passes through the dimming module (and then through a transmissive near-eye display) in response to the dimming value. In an embodiment, dimming module driver 249 applies a predetermined amount of current for a predetermined amount of time to a dimming module 198, in particular to transparent conductors of a one or more monochrome electrochromic cells in a dimming module 198. The current then causes an electrochromic reaction that limits a predetermined amount of light passing through dimming module 198 in response to dimming module ND value 249a.

Figure 8B:
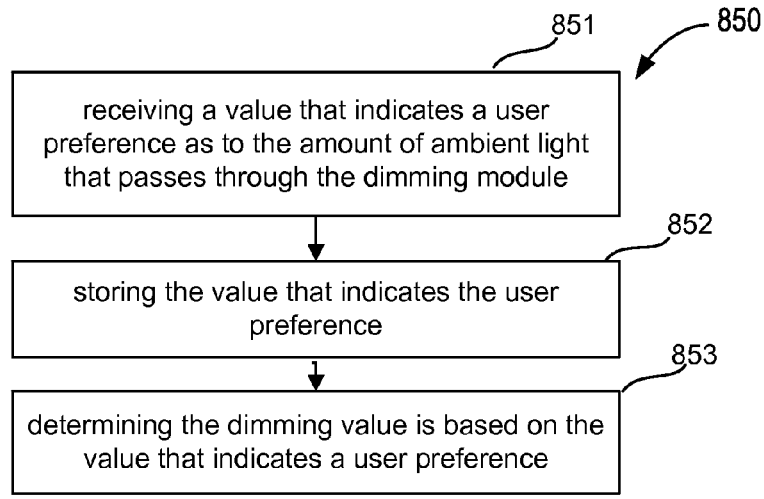

In an embodiment, method 850 of FIG. 8B may replace steps 801-805 of method 800. Step 851 illustrates receiving a value that indicates a user preference as to the amount of ambient light that passes through the dimming module. In an embodiment, a user may provide a user preference by way of a user or natural language user interface as described herein. For example, a user may make a speech command, such as "dim 50%."

Step 852 illustrates storing the value that indicates the user preference. In an embodiment, user preference value 244b is stored in memory 244 as illustrated in FIG. 2. In an embodiment, a natural language or 3D user interface software component receives a spoken or gestured user preference and translates the spoken or gestured preference to a digital value representing that preference as user preference value 244b. In an alternate embodiment, step 852 may be omitted and the user preference may not be stored.

Step 853 illustrates determining the dimming value is based on the value that indicates a user preference. In an embodiment, dimming 244f executing by processing unit 210 makes this determination in response to user preference value 244b.

Figure 8C:
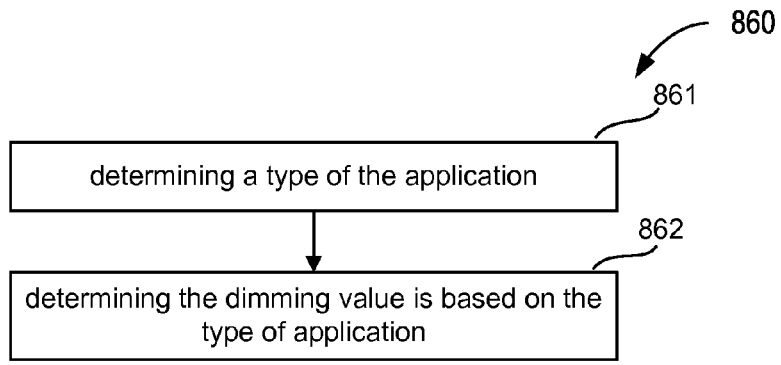

In an embodiment, method 860 shown in FIG. 8C may replace steps 801-805 of method 800. Step 861 illustrates determining a type of the application. In an embodiment, an application 244a executing by processing unit 210 provides the type of application to an operating system or dimming 244f. In an alternate embodiment, dimming 244f executing by processing unit 210 queries application 244a for a type.

Step 862 illustrates determining the dimming value is based on the type of application. In an embodiment, dimming 244f executed by processing unit 210 sets a dimming value in response to a type of application that is executing or will be executing. For example, dimming 244f sets dimming module ND value 249a to a value corresponding to a dark state when a movie player is executing and may set a dimming value module ND value 249a to correspond to a transmissive state for messaging application.

Figure 8D:
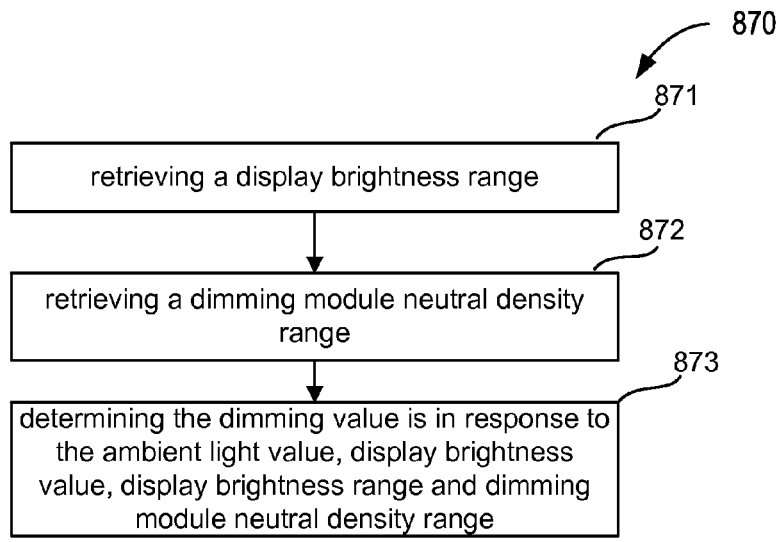

In an embodiment, method 870 shown in FIG. 8D is performed in combination with method 800 in FIG. 8A. Step 871 illustrates retrieving a display brightness range. In an embodiment, dimming 244f executed by processing unit 210 retrieves a display brightness rage from display brightness range 244d in memory 244.

Step 872 illustrates retrieving a dimming module neutral density (ND) range. In an embodiment, dimming 244f executed by processing unit 210 retrieves a dimming module neutral density (ND) range 244e stored in memory 244.

Step 873 illustrates determining the dimming value is in response to the ambient light value, display brightness value, display brightness range and dimming module neutral density range. In an embodiment, dimming 244f executed by processing unit 210 performs at least part of step 873. In an embodiment, the dimming value is determined based on the ambient light value, display brightness value, display brightness range and dimming module ND range, singly or in combination thereof, as described herein.

FIG. 9 is a block diagram of one embodiment of an exemplary computing system 900 that can be used to implement a network accessible computing system(s) 12, a companion processing module 4, or another embodiment of control circuit 136 of a HMD 2. Computing system 900 may host at least some of the software components of computing environment 54. In an embodiment, computing system 900 may be embodied in a Cloud server, server, client, peer, desktop computer, laptop computer, hand-held processing device, tablet, smartphone and/or wearable computing/processing device.

In its most basic configuration, computing system 900 typically includes one or more processing units (or cores) 902 or one or more central processing units (CPU) and one or more graphics processing units (or cores) (GPU). Computing system 900 also includes memory 904. Depending on the exact configuration and type of computer system, memory 904 may include volatile memory 905 (such as RAM), non-volatile memory 907 (such as ROM, flash memory, etc.) or some combination thereof. This most basic configuration is illustrated in FIG. 9 by dashed line 906.

Additionally, computing system 900 may also have additional features/functionality. For example, computing system 900 may also include additional storage (removable and/or non-removable) including, but not limited to, magnetic or optical disks or tape. Such additional storage is illustrated in FIG. 9 by removable storage 908 and non-removable storage 910.

Alternatively, or in addition to processing unit(s) 902, the functionally described herein can be performed or executed, at least in part, by one or more other hardware logic components. For example, and without limitation, illustrative types of hardware logic components that can be used include Field-programmable Gate Arrays (FPGAs), Program Application-specific Integrated Circuits (ASICs), Program Application-specific Standard Products (ASSPs), System-on-a-chip systems (SOCs), Complex Programmable Logic Devices (CPLDs) and other like type of hardware logic components.

Computing system 900 may also contain communication module(s) 912 including one or more network interfaces and transceivers that allow the device to communicate with other computer systems. Computing system 900 may also have input device(s) 914 such as keyboard, mouse, pen, microphone, touch input device, gesture recognition device, facial recognition device, tracking device or similar input device. Output device(s) 916 such as a display, speaker, printer, or similar output device may also be included.

A user interface (UI) software component to interface with a user may be stored in and executed by computing system 900. In an embodiment, computing system 900 stores and executes a NUI and/or 3D UI. Examples of NUIs include using speech recognition, touch and stylus recognition, gesture recognition both on screen and adjacent to the screen, air gestures, head and eye tracking, voice and speech, vision, touch, hover, gestures, and machine intelligence. Specific categories of NUI technologies include for example, touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which may provide a more natural interface, as well as technologies for sensing brain activity using electric field sensing electrodes (EEG and related methods).

In an embodiment, a UI (including a NUI or 3D UI) software component may be at least partially executed and/or stored on a computing system 900. In an alternate embodiment, a UI may be at least partially executed and/or stored on server and sent to a client. The UI may be generated as part of a service, and it may be integrated with other services, such as social networking services.

The example computing systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computing system.

Aspects of Certain Embodiments

One or more embodiments include an apparatus comprising a support structure, a near-eye display to provide image light and a dimming module. The dimming module comprises: a first transparent substrate, a first transparent conductor, a monochrome electrochromic compound, an insulator, a second transparent conductor and a second transparent substrate. The dimming module controls light passing through the dimming module in response to a current applied between the first and second transparent conductors.

In an embodiment, the monochrome electrochromic compound and insulator are disposed at least partially between the first transparent conductor and the second transparent conductor.

In another embodiment, the insulator is disposed at least partially adjacent the monochrome electrochromic compound and the first transparent conductor is disposed at least partially adjacent the monochrome electrochromic compound.

In still another embodiment, the first transparent conductor is disposed at least partially between the first transparent substrate and the monochrome electrochromic compound. The second transparent conductor is disposed at least partially between the insulator and the second transparent substrate.

In an embodiment, the dimming module is disposed adjacent the near-eye display.

In an embodiment, the dimming module includes a third transparent conductor, another monochrome electrochromic compound, another insulator and a fourth transparent conductor.

In embodiments, the first and second transparent substrates includes a material selected from a group consisting of Poly(methyl methacrylate) (PMMA), polycarbonate and glass. The first and second transparent conductors includes a material selected from a group consisting of Indium Tin Oxide, metal mesh, silver nanowires, carbon nanotubes, graphene and PEDOT:PSS (Poly(3,4-ethylenedioxythiophene)polystyrene sulfonate) in embodiments. The insulator includes silicon dioxide ($SiO_2$) in an embodiment.

One or more embodiments of a method comprises sensing an ambient light value associated with an amount of ambient light received by a transmissive near-eye display. An application executes to provide image light to the transmissive near-eye display. A near-eye display brightness value associated with the application is retrieved and a dimming value for a dimming module is determined in response to the ambient light value and the near-eye display brightness value. The amount of ambient light that passes through the dimming module is limited in response to the dimming value.

In another method embodiment, the method comprises receiving a value that indicates a user preference as to the amount of ambient light that passes through the dimming module. The determining the dimming value is based on the value that indicates the user preference rather than in response to the ambient light value and near-eye display brightness value.

In an embodiment, the method further comprises determining a type of the application and wherein determining the dimming value is based on the type of the application rather than in response to the ambient light value and the near-eye display brightness value.

In an embodiment, the type of the application includes a movie type, and wherein determining the dimming value includes setting the dimming value so that the ambient light that passes through the dimming module is reduced to a minimum.

In an embodiment, the determining the dimming value in response to the ambient light value and the near-eye display brightness value comprises: retrieving a near-eye display brightness range and retrieving a dimming module neutral density range. Determining the dimming value is in response to the ambient light value, near-eye display brightness value, near-eye display brightness range and dimming module neutral density range.

In an embodiment, the dimming module includes a monochrome electrochromic cell, and wherein limiting the amount of ambient light that passes through the dimming module in response to the dimming value comprises: applying an amount of current to the monochrome electrochromic cell in response to the dimming value.

One or more embodiments including a computing system and a HMD having a near-eye display. The computing system provides an electronic signal representing image data. The HMD provides image data in response to the electronic signal. The HMD includes a NED device comprising a display engine to output the image data, a transmissive near-eye display to provide image light in response to the image data, a dimming module and a control circuit. The dimming module reduces an amount of ambient light that passes through the transmissive near-eye display in response to a current. The control circuit provides the current in response to a dimming value.

In an embodiment, a dimming module comprises a first and second transparent conductors and a monochrome electrochromic cell. Current is applied to the first and second transparent conductors from a control circuit.

In an embodiment, the apparatus further comprises an ambient light sensor to sense an ambient light value associated with the amount of ambient light. The computing system determines the dimming value in response to at least the ambient light value.

In an embodiment, the computing system provides the electrical signal in response to the computing system executing an application, wherein the application has a display brightness value. The computing system determines the dimming value in response to at least one of the ambient light value and the display brightness value.

In an embodiment, the near-eye transmissive display has a display brightness range and the dimming module has a dimming range. The computing system determines the dimming value in response to the ambient light value, the display brightness value, the display brightness range and the dimming range.

Embodiment described in the previous paragraphs may also be combined with one or more of the specifically disclosed alternatives.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. An apparatus comprising:
a support structure;
a near-eye display, disposed on the support structure, to provide image light; and,
a dimming module comprising:
at least a first, second and third transparent conductors,
at least two layers of a monochrome electrochromic compound interspersed between the at least first, second and third transparent conductors, and
an insulator,
wherein the dimming module controls light passing through the dimming module in response to a current applied between the first, second and third transparent conductors, the dimming module capable of blocking at least 99% of ambient light from passing through the dimming module.

2. The apparatus of claim 1, wherein the dimming module further comprises:
a first transparent substrate;
a second transparent substrate; and
wherein the insulator and monochrome electrochromic compound are disposed at least partially between the first transparent conductor and the second transparent conductor.

3. The apparatus of claim 2, wherein the first transparent conductor is disposed at least partially adjacent the monochrome electrochromic compound, and
wherein the insulator is disposed at least partially adjacent the monochrome electrochromic compound.

4. The apparatus of claim 3, wherein the first transparent conductor is disposed at least partially between the first transparent substrate and the electrochromic compound, and
wherein the second transparent conductor is disposed at least partially between the insulator and the second transparent substrate.

5. The apparatus of claim 4, wherein the dimming module is disposed adjacent the near-eye display,
wherein the near-eye display provides image light in response to a signal from a display engine.

6. The apparatus of claim 2, wherein the first and second transparent substrates includes a material selected from the group consisting of Poly methyl methacrylate, polycarbonate and glass.

7. The apparatus of claim 6, wherein the first and second transparent conductors includes a material selected from a group consisting of Indium Tin Oxide, metal mesh, silver nanowires, carbon nanotubes, graphene and Poly(3,4-ethylenedioxythiophene) polystyrene sulfonate.

8. The apparatus of claim 7, wherein the insulator includes silicon dioxide.

9. The apparatus of claim 1, wherein the dimming module comprises:
a fourth transparent conductor,
wherein the third transparent conductor, second layer of monochrome electrochromic compound and fourth transparent conductor are stacked over the first transparent conductor, first layer of monochrome electrochromic compound and second transparent conductor.

10. An apparatus comprising:
a computing system that provides an electronic signal representing image data; and
a head-mounted display that provides image data in response to the electronic signal, wherein the head-mounted display comprising:
a near-eye display device for use with augmented reality applications and virtual reality applications, the near-eye display device comprising:
a display engine to output the image data,
a transmissive near-eye display to provide image light in response to the image data,
a dimming module to control an amount of ambient light that passes through the transmissive near-eye display in response to a current, and
a control circuit to provide the current in response to a dimming value;
wherein the application has a display brightness value,
wherein the near-eye transmissive display has a display brightness range and the dimming module has a dimming range, and
wherein the computing system determines the dimming value in response to the ambient light value, the display brightness value, the display brightness range and the dimming range.

11. The apparatus of claim 10, wherein the dimming module comprises:
a first transparent conductor;
a monochrome electrochromic cell; and
a second transparent conductor,
wherein the current is applied to the first and second transparent conductors.

12. An apparatus comprising:
a support structure;
a near-eye display, disposed on the support structure, to provide image light; and,
a dimming module comprising:
a first transparent conductor,
a monochrome electrochromic compound,
an insulator, and
a second transparent conductor; and
a processor operable to:
sense an ambient light value associated with an amount of ambient light received by the near-eye display,
execute an application to provide image light to the near-eye display, retrieve a near-eye display brightness value associated with the application, determine a dimming value for the dimming module in response to the ambient light value and the near-eye display brightness value, and limit the amount of ambient light that passes through the dimming module in response to the dimming value.

13. The apparatus of claim 12, the processor further operable to:

receive a value that indicates a user preference as to the amount of ambient light that passes through the dimming module, wherein determining the dimming value is based on the value that indicates the user preference rather than in response to the ambient light value and near-eye display brightness value.

14. The apparatus of claim 12, the processor further operable to:

determine a type of the application and wherein determining the dimming value is based on the type of the application rather than in response to the ambient light value and the near-eye display brightness value.

15. The apparatus of claim 12, wherein the type of the application includes a movie type, and wherein determining the dimming value includes setting the dimming value so that the ambient light that passes through the dimming module is reduced to a minimum.

* * * * *